3,351,641
3β-ACETOXY-5α-HYDROXY-17α-BROMO-
PREGNANE-6,20-DIONE
Gordon S. Myers, Mount Royal, Montreal, Quebec, and
Anthonie J. Verwijs, Montreal, Quebec, Canada, assignors to American Home Products Corporation, New
York, N.Y., a corporation of Delaware
No Drawing. Filed Nov. 30, 1965, Ser. No. 510,697
1 Claim. (Cl. 260—397.4)

ABSTRACT OF THE DISCLOSURE

There is herein disclosed a process of preparing 3β,5α-dihydroxy - 17α - methyl - 17β - carbomethoxyandrostan-6-one by treating 3β - acetoxy - 5α - hydroxypregnane-6,20-dione with a brominating agent in the presence of a peroxide catalyst, whereupon the compound 3β-acetoxy - 5α - hydroxy-17α-bromopregnane-6,20-dione is secured; and the latter compound is then treated with an alkali metal bicarbonate in aqueous methanol, resulting in the compound 3β,5α-dihydroxy-17α-methyl-17β-carbomethoxyandrostan-6-one.

---

This invention relates to a new and improved method for preparing steroidal compounds of the formula

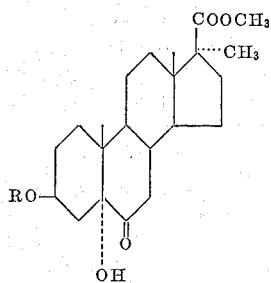

wherein R represents hydrogen or the acetyl group.

Among compounds which may be prepared by our improved method is the compound wherein R in the above Formula V represents hydrogen, this being the compound 3β,5α - dishydroxy - 17α - methyl - 17β - carbomethoxyandrostan-6-one.

Our invention is also directed to new intermediate compounds which are prepared and utilized in our improved process.

Compounds of the formula given, especially those wherein R represents hydrogen or an acetyl group (CH₃CO), are useful in the synthesis of the highly effective oral progestational agent 6,17α-dimethyl-4,6-pregnadiene-3,20-dione. This oral progestational agent is disclosed and claimed in Deghenghi Patent No. 3,133,913 and a process for its preparation is disclosed and claimed in the Morand and Deghenghi Patent No. 3,170,936. Compounds of Formula V are disclosed in the Morand and Deghenghi patent (as IIIa and IIIb), and are used therein in a synthesis of the progestin 6,17α-dimethyl-4,6-pregnadiene-3,20-dione.

Our new and improved process makes possible the production of compounds of the formula given above, Formula V, especially compounds wherein R represents hydrogen or acetyl, by a simplified procedure and in high yields. Because of this the cost of manufacturing the orally-active progestin 6,17α-dimethyl-4,6-pregnadiene-3,20-dione, by a procedure wherein said compounds are utilized as intermediate, has been greatly reduced.

In the preparation of steroidal compounds of Formula V as given above, including 3β,5α-dihydroxy-17α-methyl-17β-carbomethoxyandrostan-6-one, in accordance with previously available methods, starting with pregnenolone acetate, Compound I, it has been necessary to carry out a fairly elaborate six-step synthesis. This six-step synthesis may be represented as follows:

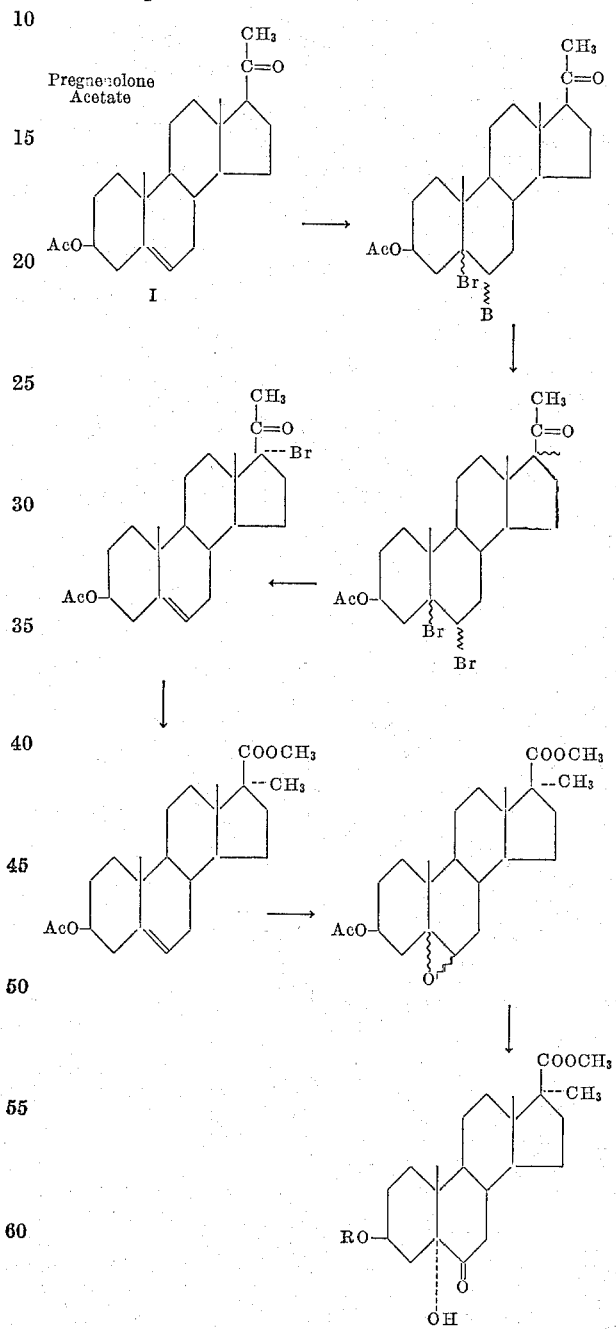

wherein Ac represents acetyl, and R represents either hydrogen or the acetyl group.

Because of its elaborate nature, this six-step synthesis resulted only in relatively low yields of product, and steroidal compounds of the Formula V as given above were prepared thereby at relatively high cost.

Surprisingly enough, we have now found that the steroidal diketone, 3β - acetoxy-5α-hydroxy-pregnane-6,20-dione, a compound of the formula:

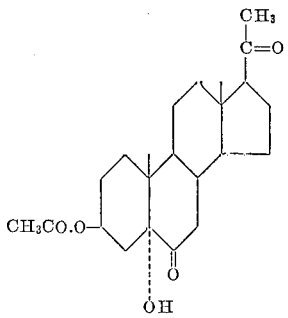

III when treated with N-bromosuccinimide in the presence of a peroxide catalyst brominates selectively and almost exclusively at carbon atom–17. This carbon atom is in α-position to the C–20 ketone group. Surprisingly enough no bromination takes place at carbon atom–7, which carbon atom is in the α-position to the C–6 ketone group.

As a result of this selective bromination of 3β-acetoxy-5α-hydroxy-pregnane-6,20-dione in the 17-position there is secured a new and previously unknown compound, 3β-acetoxy-5α-hydroxy-17α-bromo-pregnane-6,20-dione. This compound has the formula:

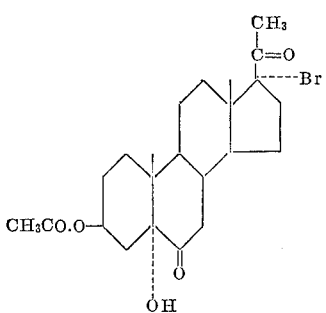

IV

3β - acetoxy - 5α-hydroxy-17α-bromo-pregnane-6,20-dione undergoes the Favorski rearrangement when treated with an alkali metal bicarbonate, in methanol, this being in accordance with the procedure described, for example, by Rappe in Acta Chem. Scand., vol. 17 (1963), No. 10. This rearrangement results in 17α-methyl-17β-carbomethoxy-androstan-6-one of the formula:

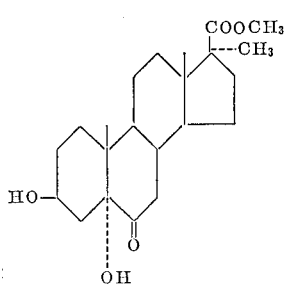

in almost quantitative yields.

Since the selective bromination of Compound III proceeds under circumstances wherein the bromine is introduced selectively, and almost exclusively, at carbon atom–17, a new and improved synthesis is possible, starting with pregnenolone acetate, whereby compounds of Formula V may be readily prepared in high yields by means of a synthesis which involves only four steps. This four-step synthesis, starting with Compound I, pregnenolone acetate, may be represented as follows:

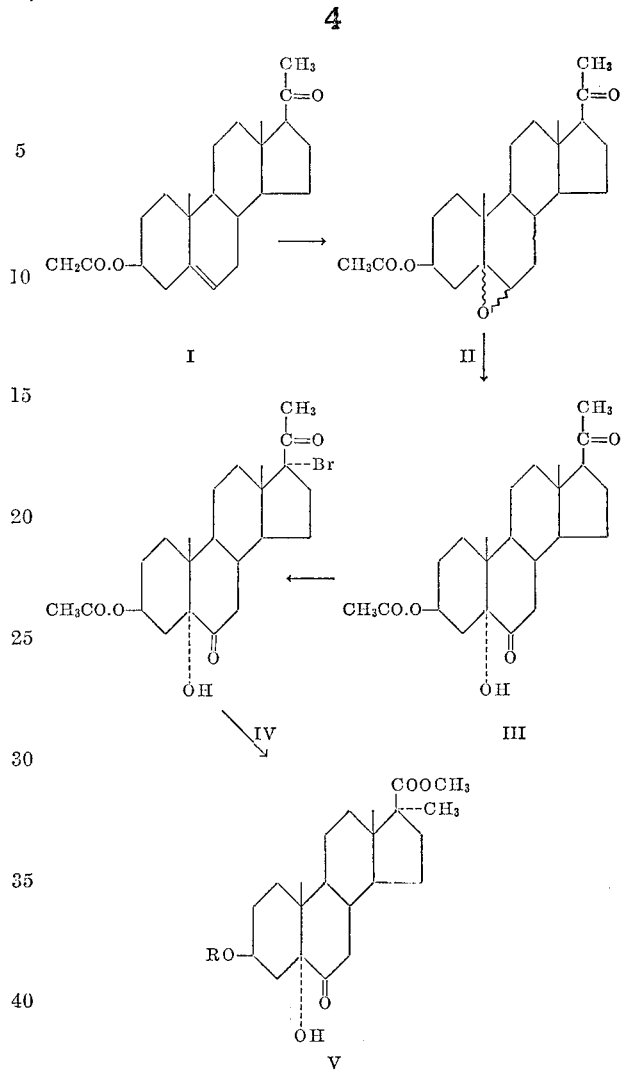

R represents hydrogen or an acyl (acetyl) group.

In this synthesis the starting material, Compound I, is pregnenolone acetate. Compound III is 3β-acetoxy-5α-hydroxy-pregnane-6,20-dione, while Compound IV, resulting from the selective bromination at carbon atom–17, is the new chemical compound 3β-acetoxy-5α-hydroxy-17α-bromo-pregnane-6,20-dione. As stated above, the latter compound undergoes the Favorski rearrangement to yield Compound V, which compound is useful in the synthesis of the orally-active progestin 6,17α-dimethyl-4,6-pregnadiene-3,20-dione, as disclosed in U.S. Patent No. 3,170,936.

As an essential step in our new and improved process for the preparation of compounds of Formula V, the selective bromination of 3β-acetoxy-5α-hydroxy-pregnane-6,20-dione is preferably carried out by treating this compound with an excess of a brominating agent such as N-bromosuccinimide, N-bromoacetamide or other N-bromoamide, preferably in the presence of a peroxide catalyst such as benzoyl peroxide, at a temperature within the range of about 50° C. to the boiling point of the solvent. This procedure results in good yields of the 17-bromo steroid, Compound IV. During the bromination step no bromine is introduced at carbon atom–7, and therefore no undesirable by-products are formed. This selective bromination of Compound III may be conveniently carried out by adding a peroxide catalyst, such as benzoyl peroxide, to a mixture of 3β-acetoxy-5α-hydroxy-pregnane-6,20-dione (Compound III) and an inert solvent, preferably carbontetrachloride, in the presence of a weak organic base such as pyridine. This mixture is warmed, and then preferably heated to reflux for about one hour. While lower temperatures, such as those as low as about 50° C., may be utilized for the reaction, the use of lower temperatures requires a longer period of heating, one in excess of an hour.

The following illustrative examples further describe how this invention may be practiced.

*Example 1.—3β-acetoxy-5,6-epoxypregnan-20-one*

To a mixture of 100 grams of pregnenolone acetate and 10 grams of anhydrous sodium acetate in 400 milliliters of benzene, there is added 100 milliliters of 40 percent peracetic acid over a period of about 10 minutes. After stirring for an additional period of 10 minutes the mixture is washed with water and the benzene phase is then concentrated to dryness to give 100 grams (an almost quantitative yield) of a mixture of 3β-acetoxy-5,6α-epoxypregnan-20-one and 3β-acetoxy-5,6β-epoxypregnan-20-one.

*Example 2.—3β-acetoxy-5α-hydroxypregnan-6,20-dione*

A solution of the crude epoxy steroid obtained in Example 1 (weight 100 grams) in 1000 milliliters of acetone, is cooled to 2° C., and to it is added over a period of 30 minutes, 125 milliliters of 50 percent aqueous chromic acid solution, keeping the temperature below 10° C. The reaction mixture is stirred for 10 minutes after the addition is complete, and the product is extracted into methylene chloride. The methylene chloride extract is washed with water and then evaporated to dryness to give 98 grams of 3β-acetoxy-5α-hydroxypregnane-6,20-dione.

*Example 3.—3β-acetoxy-5α-hydroxy-17α-bromopregnane-6,20-dione*

A mixture of 98 grams of the steroid 3β-acetoxy-5α-hydroxy-pregnane-6,20-dione obtained in Example 2, 82 grams of N-bromosuccinimide, 27 milliliters of pyridine and 2000 milliliters of carbontetrachloride is warmed to the boiling point. To this boiling mixture is added 6.8 grams of benzoyl peroxide, and after a further period of 40 minutes of refluxing, the precipitate is removed by filtration and the filtrate is washed with aqueous sodium bisulfite and water. The filtrate is then evaporated to dryness to yield 100 grams of 3β-acetoxy-5α-hydroxy-17α-bromo-pregnane-6,20-dione.

*Example 4.—3β,5α-dihydroxy-17α-methyl-17β-carbomethoxy-androstan-6-one*

To a refluxing solution of 100 grams of the crude 3β-acetoxy-5α-hydroxy-17α-bromo-pregnane-6,20-dione obtained in Example 3 in 1200 milliliters of methanol, there is added a solution of 37 grams of potassium bicarbonate in 112 milliliters of water. Refluxing is continued while three-quarters of the methanol is distilled off. The residue is then diluted with 1 liter of water. The precipitate which separates is removed by filtration and digested with 50 milliliters of methanol to give 65 grams of purified 3β,5α-dihydroxy - 17α - methyl - 17β-carbomethoxy-androstan-6-one; M.P. 279–281° C.

*Example 5.—3β-acetoxy-5α-hydroxy-17α-methyl-17β-carbomethoxyandrostan-6-one*

A mixture of 5 grams of 3β,5α-dihydroxy-17α-methyl-17β-carbomethoxyandrostan-6-one, 15 milliliters of pyridine and 15 milliliters of acetic anhydride is warmed to 80° C. for a few minutes and then diluted with water. The precipitate which separates is removed by filtration and crystallized from benzene to give 4 grams of 3β-acetoxy - 5α - hydroxy-17α-methyl-17β-carbomethoxyandrostan-6-one; M.P. 233–235° C.

We claim:

3β-acetoxy-5α-hydroxy-17α-bromopregnane-6,20-dione.

References Cited

UNITED STATES PATENTS 2,684,963   7/1954   Schock et al. _____ 260—239.55

OTHER REFERENCES

Fieser et al., Steroids, N. T. Reinhold, 1959, pp. 560 and 561.

LEWIS GOTTS, *Primary Examiner.*

T. M. MESHBESHER, *Assistant Examiner.*

UNITED STATES PATENT OFFICE
CERTIFICATE OF CORRECTION

Patent No. 3,351,641                        November 7, 1967

Gordon S. Myers et al.

It is hereby certified that error appears in the above numbered patent requiring correction and that the said Letters Patent should read as corrected below.

Column 2, lines 10 to 23, the right-hand formula should appear as shown below instead of as in the patent:

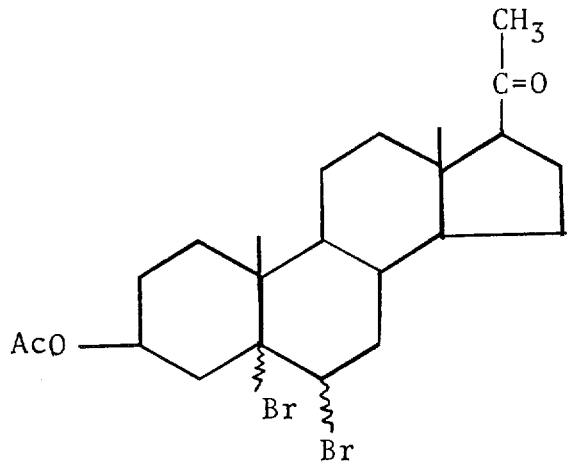

same column 2, lines 25 to 38, the right-hand formula should appear as shown below instead of as in the patent:

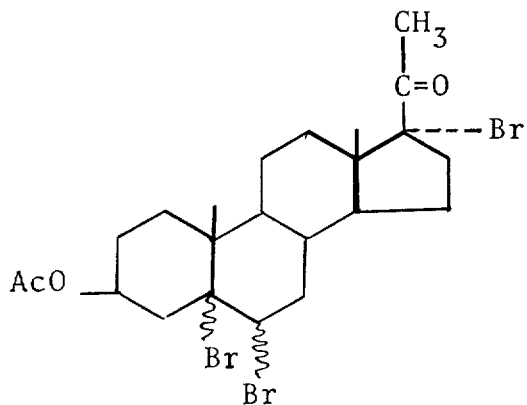

Signed and sealed this 17th day of December 1968.

(SEAL)
Attest:

EDWARD M. FLETCHER, JR.                    EDWARD J. BRENNER
Attesting Officer                           Commissioner of Patent